United States Patent [19]

Nissim

[11] 4,344,622

[45] Aug. 17, 1982

[54] DISPLAY APPARATUS FOR ELECTRONIC GAMES

[75] Inventor: Joseph Nissim, Huntington Beach, Calif.

[73] Assignee: Rockwell International Corporation, El Segundo, Calif.

[21] Appl. No.: 76,556

[22] Filed: Sep. 18, 1979

Related U.S. Application Data

[63] Continuation of Ser. No. 916,036, Jun. 16, 1978, abandoned, which is a continuation of Ser. No. 781,807, Mar. 28, 1977, abandoned.

[51] Int. Cl.[3] .......................... A63F 9/00; A63F 9/14; G06F 3/14

[52] U.S. Cl. ................................ 273/85 G; 273/86 R; 273/94; 340/754; 340/168 S; 340/782; 340/792; 340/799

[58] Field of Search ................. 273/1 GC, 1 E, 85 G, 273/138 A, 237, DIG. 28, 313-315; 340/750, 723-727, 715, 716, 762, 782, 753, 754, 781, 791, 792, 799; 313/500

[56] References Cited

U.S. PATENT DOCUMENTS

| | | | |
|---|---|---|---|
| B 351,493 | 1/1975 | Ingle | 340/793 |
| 3,627,924 | 12/1971 | Fleming . | |
| 3,634,849 | 1/1972 | Nishizawa et al. | 340/166 EL |
| 3,696,393 | 10/1972 | McDonald | 340/754 |
| 3,710,379 | 1/1973 | Bruinsma | 340/168 S |
| 3,728,714 | 4/1973 | Kolesar et al. . | |
| 3,733,435 | 5/1973 | Chodil et al. . | |
| 3,740,570 | 6/1973 | Kaelin et al. . | |
| 3,752,910 | 8/1973 | Lewis . | |
| 3,761,617 | 9/1973 | Tsuchiya et al. . | |
| 3,765,011 | 10/1973 | Sawyer et al. . | |
| 3,786,474 | 1/1974 | Miller . | |
| 3,787,834 | 1/1974 | Elliot . | |
| 3,789,387 | 1/1974 | Hurst | 340/380 |
| 3,792,465 | 2/1974 | Collins et al. | 340/168 S |
| 3,793,629 | 2/1974 | Sharpless . | |
| 3,798,632 | 3/1974 | Liddle . | |
| 3,821,616 | 6/1974 | Kravitz | 313/500 |
| 3,827,042 | 7/1974 | Mandzsu et al. . | |
| 3,863,023 | 1/1975 | Schmersal et al. . | |
| 3,874,669 | 4/1975 | Ariano et al. | 273/85 G |
| 3,886,403 | 5/1975 | Owaki et al. . | |
| 3,890,170 | 6/1975 | Russ | 313/500 |
| 3,893,149 | 7/1975 | Grenon | 340/782 |
| 3,909,788 | 9/1975 | Kaelin et al. | 340/782 |
| 4,009,335 | 2/1977 | Payne et al. . | |
| 4,019,745 | 4/1977 | Mustelier | 273/236 |
| 4,059,272 | 11/1977 | Pullman | 273/265 |
| 4,060,242 | 11/1977 | Huang et al. | 273/1 GC |
| 4,085,352 | 4/1978 | Hilton | 340/782 |
| 4,093,223 | 6/1978 | Wilke et al. | 273/85 G |
| 4,114,095 | 9/1978 | Pankove et al. | 340/782 |
| 4,155,095 | 5/1979 | Kirschner | 273/DIG. 28 |
| 4,162,792 | 7/1979 | Chang et al. | 273/85 G |
| 4,229,736 | 10/1980 | Rougeot | 340/782 |

OTHER PUBLICATIONS

Soshea, R. W., and Steward, R. L.; "Strobed Led Display Breaks the Design Cost Barrier"; *Electronics;* pp. 64-67; Jan. 17, 1972.

*Bally Alley Service Manual;* Bally Manufacturing Corp.

*Primary Examiner*—Vance Y. Hum

*Attorney, Agent, or Firm*—H. Fredrick Hamann; Wilfred G. Caldwell

[57] ABSTRACT

An LED matrix display is disclosed having a plurality of light-emitting diodes of appropriate size, shape and spacing to emulate the appearance of lighted objects in substantially continuous motion. Application and duration of control signals are controlled by a programmed microprocessor to produce a video-like display primarily suitable for use in conjunction with hand-held electronic games.

9 Claims, 28 Drawing Figures

$t_1$ $t_2$ $t_3$ $t_4$ $t_5$ $t_6$ $t_7$ $t_8$ $t_9$

DISPLAY APPARATUS FOR ELECTRONIC GAMES

This is a continuation of application Ser. No. 916,036, filed June 16, 1978, which is a continuation of application Ser. No. 781,807, filed Mar. 28, 1977, both of which are now abandoned.

BACKGROUND OF THE INVENTION

1. Field of the Invention

The present invention relates to display apparatus for use principally in hand-held electronic games. The invention relates more specifically to a light-emitting diode display apparatus capable of displaying a plurality of lighted objects that give the appearance of being in substantially continuous motion.

2. Description of the Prior Art

With the recent advent of electronic video games that operate in conjunction with the common television set, the public has become increasingly aware of the leisure time enjoyment that may be derived from game-type electronic devices. Even more recently, microprocessor computers have been employed to lend visual sophistication to the games. Furthermore, the cathode ray tube display of the television provides game players with readily viewable action games.

Unfortunately, one disadvantage of such cathode ray tube video game is that they are generally not portable because of their large size and the requirement for substantial amounts of electric power. However, the recent availability of relatively sophisticated microprocessor computers in the form of one or two integrated circuit chips, has made it feasible to produce electronic games that are small enough to be held in one hand by the game player and to be operated by means of small dry cell batteries. Accordingly, such games can be made portable inasmuch as they are about the same size and weight as well-known hand-held electronic calculators.

However, one problem associated with the production of video type games in small packages, that are operated by relatively low power sources, is the requirement for a commensurately low-power video display that still permits the emulation of moving game pieces such as is achieved in television set games by means of cathode ray tube electrode control.

Although light-emitting diode devices have been previously employed in a game apparatus (see for example U.S. Pat. No. 3,902,723 issued Sept. 2, 1975 to Colling et al), the prior art known to applicant does not disclose the use of a matrix of light-emitting diodes in a hand-held electronic game apparatus to emulate continuously moving lighted objects that may be controllable and made interactive in the game operation.

Furthermore, although LEDs of a discrete chip type have been arranged in matrix configuration and have ancillary circuit control to provide apparent brightness distinction as a function of current duration (see for example U.S. Pat. No. 3,740,570 issued June 19, 1973 to Kaelin et al), no prior art known to applicant has taught the use of such a matrix in a hand-held electronics game. More specifically, no such prior art has taught the selection of the appropriate light-emitting area size and shape and selection of appropriate relative spacing between diodes in such a matrix display which can be utilized in such a game to emulate the appearance of lighted objects in substantially continuous motion. Nor has the known prior art taught the means by which such objects may be distinguished from one another, namely by controlling apparent brightness by selectively changing the duration of the current through diodes within the array.

SUMMARY OF THE INVENTION

The present invention provides a display for hand-held electronic games by employing a matrix array of discrete light-emitting diode devices. The light emitting area of each such diode has an appropriate size and shape. Also, the spacing between respective light emitting areas is such that the matrix array diodes provide a realistic emulation of lighted objects that appear to be in substantially continuous motion. Brightness variation of selected diodes provides means for distinguishing some objects from others.

DESCRIPTION OF A PREFERRED EMBODIMENT OF THE INVENTION

Figure 1:
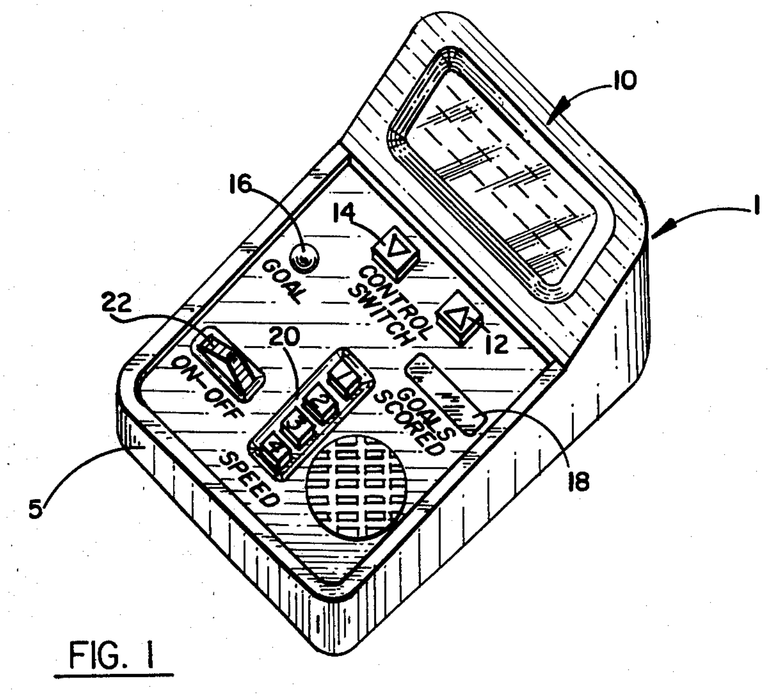
FIG. 1 is a perspective drawing of a hand-held electronic game of the type in which the display of the present invention may be employed.

Referring now to FIG. 1, there is shown a three-dimensional drawing of an electronic hand-held game 1 in which a display 10 of the present invention is employed. This particular electronic game is only an illustrative example of how the display of the present invention can be utilized in a hand-held electronic game. FIG. 1 illustrates the use of a 3×7 matrix of discrete LED chips forming the display of a game in which a player controlled lighted object moves from left to right (or vice versa) along rows selected by means of switches 12 and 14.

During the player's attempt to reach the right side of the display to score a goal, computer controlled attack pieces appear to be in continuous motion in a direction opposite to the direction of the piece controlled by the player. The player's objective is to utilize switches 12 and 14 to dodge attack pieces and thereby avoid apparent coincidence of lighted objects which appear to be in relatively continuous motion. The program of the microprocessor contained within the hand-held electronic game is designed to provide special rules of progression and regression of the player-controlled piece as a function of the number of attack pieces dodged as well as a function of the number of times position coincidence of control pieces and attack pieces occurs.

The typical hand-held electronic game of FIG. 1 may also include a case 5 and a goal light 16 which indicates the achievement of maneuvering a controlled piece to the far right side of the display to score a goal. Also included is a "goals scored" display 18 which comprises, for example, two monolithic 7 segment LED digital numeric displays to indicate the number of times a goal is scored. Speed switches 20 may be employed to vary the apparent velocity of the attack pieces and control piece to permit variation in the skill required in dodging the attack pieces to score a goal. An on/off switch 22 is shown which would be employed to apply power from an enclosed dry cell battery or other suitable source of electrical power (not shown) to the circuits within the hand-held electronic game.

The particular embodiment of the electronic game of FIG. 1 is not limitative of the invention herein disclosed but is merely illustrative of one of the many ways in which the display of the present invention may be utilized.

Figure 2:
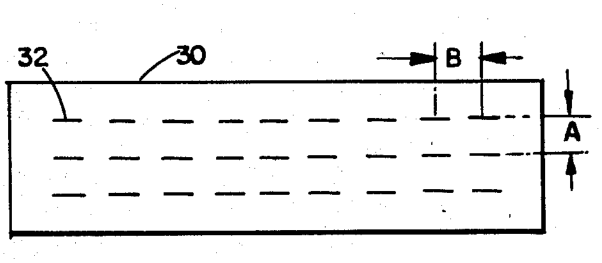
FIGS. 2, 3 and 4 provide three examples of LED matrix configurations employed in displays for electronic hand-held games.
Figure 3:
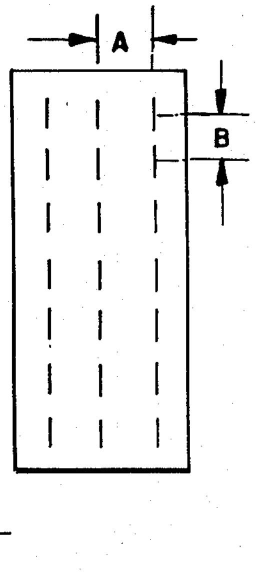
Figure 4:
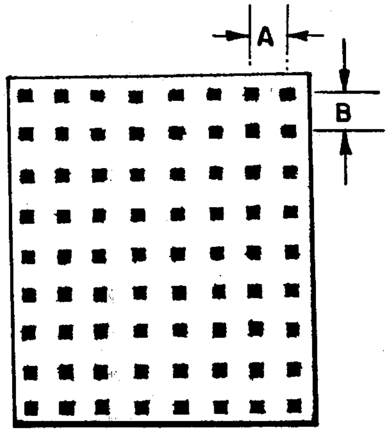

FIGS. 2, 3 and 4 are drawings of three different embodiments of displays of the present invention that have been reduced to practice and utilized in hand-held electronic games. FIG. 2 illustrates a 3×9 matrix of rectangular shaped LED devices. The matrix of FIG. 2 has been employed in an electronic football game in which the substantially rectangular shape of the matrix represents a football playing field. Obstacles represent defending players and the player controlled piece represents an offensive ball carrier.

FIG. 3 represents a 3×7 matrix which is employed in a race track game similar to the game illustrated in FIG. 1 except that the matrix is rotated 90° and player controlled pieces which represent racing cars, move from bottom to top, while microprocessor controlled attack pieces, which represent obstacles, move from top to bottom.

FIG. 4 represents an 8×9 matrix of square LED devices which has been employed in a pong type hand-held electronic game which is conducive to play by two players, each player controlling pieces that represent paddles and the computer controlled piece representing a paddle ball. The movement of the "paddle ball" is a function the apparent direction of motion and apparent position of a "paddle ball" and "paddle" when they are in apparent position coincidence.

The principal object of the displays of FIGS. 2, 3 and 4, is to present an emulation of apparent substantially continuous motion of computer controlled pieces and player controlled pieces. Such displays thereby enable a video-type action game utilizing electronic devices that are sufficiently small and which utilizes sufficiently little power to enable a conveniently hand-held package.

Table I indicates the size and shape of the emitting areas as well as the relative spacing of the light-emitting diodes in the displays illustrated in FIGS. 2, 3 and 4. These displays, which are illustrative only, have been found to satisfactorily provide simulation of lighted objects in substantially continuous motion in the games in which those three displays have been employed.

TABLE I

| Display | Emitting Area Size | Emitting Area Shape | Dim. A | Dim. B |
|---|---|---|---|---|
| 3 × 7 | .037 × .0035 in. | RECTANGULAR | 0.15 in. | 0.2 in. |

TABLE I-continued

| Display | Emitting Area Size | Emitting Area Shape | Dim. A | Dim. B |
|---|---|---|---|---|
| 3 × 9 | .037 × .0035 in. | RECTANGULAR | 0.2 in. | 0.25 in. |
| 8 × 9 | 0.1 × 0.1 in. | SQUARE | 0.25 in. | 0.25 in. |

It has been found preferable to employ light-emitting diodes with peak emission wavelengths of approximately 660 nm and a brightness intensity of approximately 75 microcandles using LEDs made of Gallium Arsenide Phosphide (GaAsP). However, other materials, with brightness levels and wavelengths different from those indicated above, may also be appropriate depending upon the particular application of the display.

Figure 5:
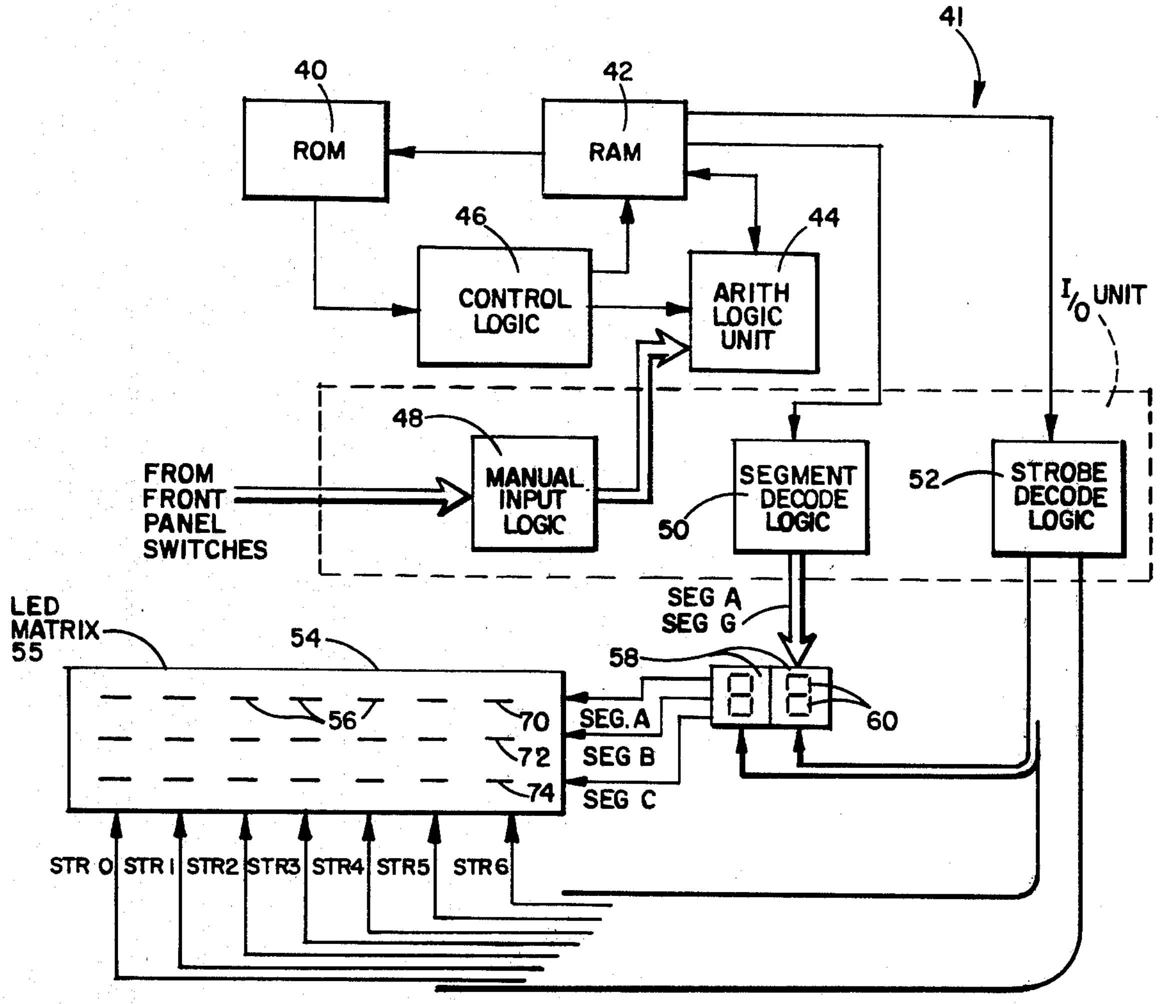
FIG. 5 is a block diagram of a microprocessor system including an embodiment of the present invention.
Figure 6:
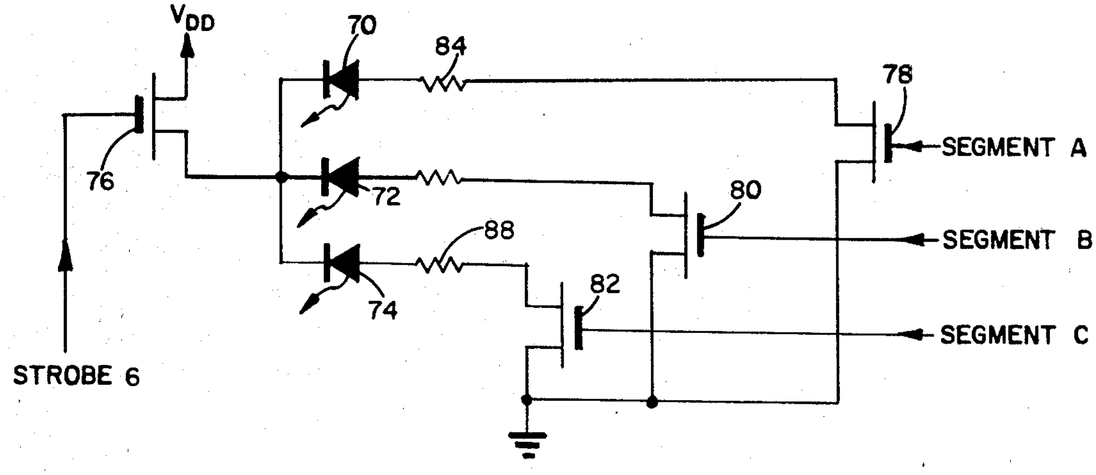
FIG. 6 is an electrical circuit which is used to explain the operation of the invention.

FIGS. 5 and 6 illustrate the manner in which the lightemission diode, display matrix of the invention, may be connected to produce an emulation of lighted objects in substantially continuous motion under the combined control of a microprocessor computer and a game player. FIG. 5 is a block diagram of a controller, for example in the form of a microprocessor computer 41, connected to appropriate decode logic and to a combined monolithic and discrete matrix LED display such as that which might be utilized in the hand-held electronic game of FIG. 1.

As shown in FIG. 5, microprocessor computer 41 comprises a read-only memory unit 40, a random access memory unit 42, an arithmetical logic unit 44 and a control logic unit 46. These units are interconnected to perform the usual computer operations of data storage, program storage, logic control and arithmetic and logic operations.

Typically, the read-only memory unit 40 is permanently or semipermanently programmed to contain playing rules of the game since these remain constant for a particular game. On the other hand, random-access memory 42 is used to store variable data generated by the control logic unit 46 and the arithmetic logic unit 44 in response to signals derived from front panel switches (see FIG. 1). In turn, the random-access memory 42 generates address signals which are used to address program information stored in the read-only memory 40. Random-access memory 42 is also used to provide working registers which permit temporary storage of information resulting from arithmetic and logic operations on binary signals during the operation of the game. Signals derived from the position of front panel switches of the game, under the control of the game player, are converted into binary signals by manual logic 48 so that they are recognizable by circuits within the microprocessor computer 41.

Signals available at output terminals of the random-access memory 42 are transferred respectively to segment decode logic 50 and strobe decode logic 52. These logic decoders are employed to select light emitting diodes 56 in LED matrix 55 in accordance with a binary code represented by the signals appearing at the respective output terminals of these two circuits.

Although, FIG. 5 illustrates a particular microprocessor computer architecture in relatively simple terms, it will be understood that the present invention does not depend upon the particular microprocessor employed and may be operated with microprocessors of different architectures. Furthermore, it will be understood that the specific operation of the microprocessor has been described herein in simple terms, because the operation of microprocessor computers is well known in the art and that the particular circuits, components, programs and signal relationships of a microprocessor computer used to operate the display constituting the present invention, need not be described in any greater detail. Suffice it to say, that for the 3×7 LED matrix represented in FIG. 5 and having 21 light-emitting diodes, strobe decode logic 52 produces seven signals designated strobe zero (STR 0) through strobe six (STR 6) to be applied to the display along with two additional strobe signals, strobe 7 (STR 7) and 8 (STR 8) which are applied to the two monolithic digital displays 58 included in FIG. 5. Furthermore, segment decode logic 50 produces seven segment signals, SEG A through SEG G, that are applied to control the seven segments of each of two monolithic displays and to provide three segment signals, SEG A, SEG B and SEG C to control the operation of the LED matrix display constituting the present invention.

The LED matrix 55 is constructed on a dielectric material 54 upon which are mounted a plurality of LEDs 56 including (for purposes of discussion in FIG. 6 below), specific LEDs 70, 72 and 74.

The monolithic digital LED displays per se, may be electrically connected to the LED matrix display of the present invention and operated in combination therewith in accordance with the truth state of the strobe signals STR 7 and STR 8 and the seven segment signals SEG A through SEG G.

As shown in FIG. 5, three segment signals, namely, SEG A, SEG B and SEG C and seven strobe signals, namely STR 0 through STR 6, are applied to the rows and columns, respectively, of the LED matrix. The particular manner in which these signals are employed to selectively enable light emission of selective light-emitting diodes is shown in the schematic diagram of FIG. 6.

As indicated in FIG. 6, the cathode terminals of the three diodes 70, 72 and 74, are connected together and to the source terminal of field effect transistor (FET) 76. The drain terminal of FET 76 is connected to a suitable reference potential, for example $V_{DD}$. The strobe signal, STR 6, as shown in FIG. 5 is applied to the gate terminal of FET 76 to control the light emission of the three diodes 70, 72 and 74. Given that FET 76 is a P-channel device, when a voltage is applied to the gate terminal that is more negative than the voltage at either the source of the drain terminal by a margin which exceeds the threshold level of the transistor, FET 76 is rendered conductive. It will be understood that this invention is not limited to P-channel MOS devices, but also contemplates the use of N-channel MOS devices, CMOS devices and bipolar devices.

On the right side of the circuit of FIG. 6, it will be observed that the segment signals, SEG A, SEG B and SEG C are applied respectively to the gate terminals of FETs 78, 80 and 82. The source terminals of these three transistors are connected together and to a suitable reference potential, for example ground. The drain terminals of transistors 78, 80 and 82 are connected to the anode terminals of the three light-emitting diodes 70, 72 and 74, respectively through current limiting resistors 84, 86 and 88 respectively.

It will now be apparent to those familiar with the art to which the present invention pertains that current through LED 70 will occur upon simultaneous application of voltages at the gate terminals of FETs 78 and FET 76 sufficient to render these two transistors conductive. Similarly, LEDs 72 and 74 will sustain current upon application of voltages at the gate terminals of FETs 80 and 82, respectively, at the same time an appropriate voltage is applied to the gate terminal of FET 76. Thus, it will be seen that upon the concurrent application of an appropriate segment signal and an appropriate strobe signal, the LED corresponding to those two signals is rendered forward biased to enable light emission. By the appropriate selection from the three segment signals SEG A, SEG B and SEG C, and from the seven strobe signals STR 0 through STR 6, any one or more of the LEDs of the LED matrix may be selected to produce the emission of light.

Figure 7:
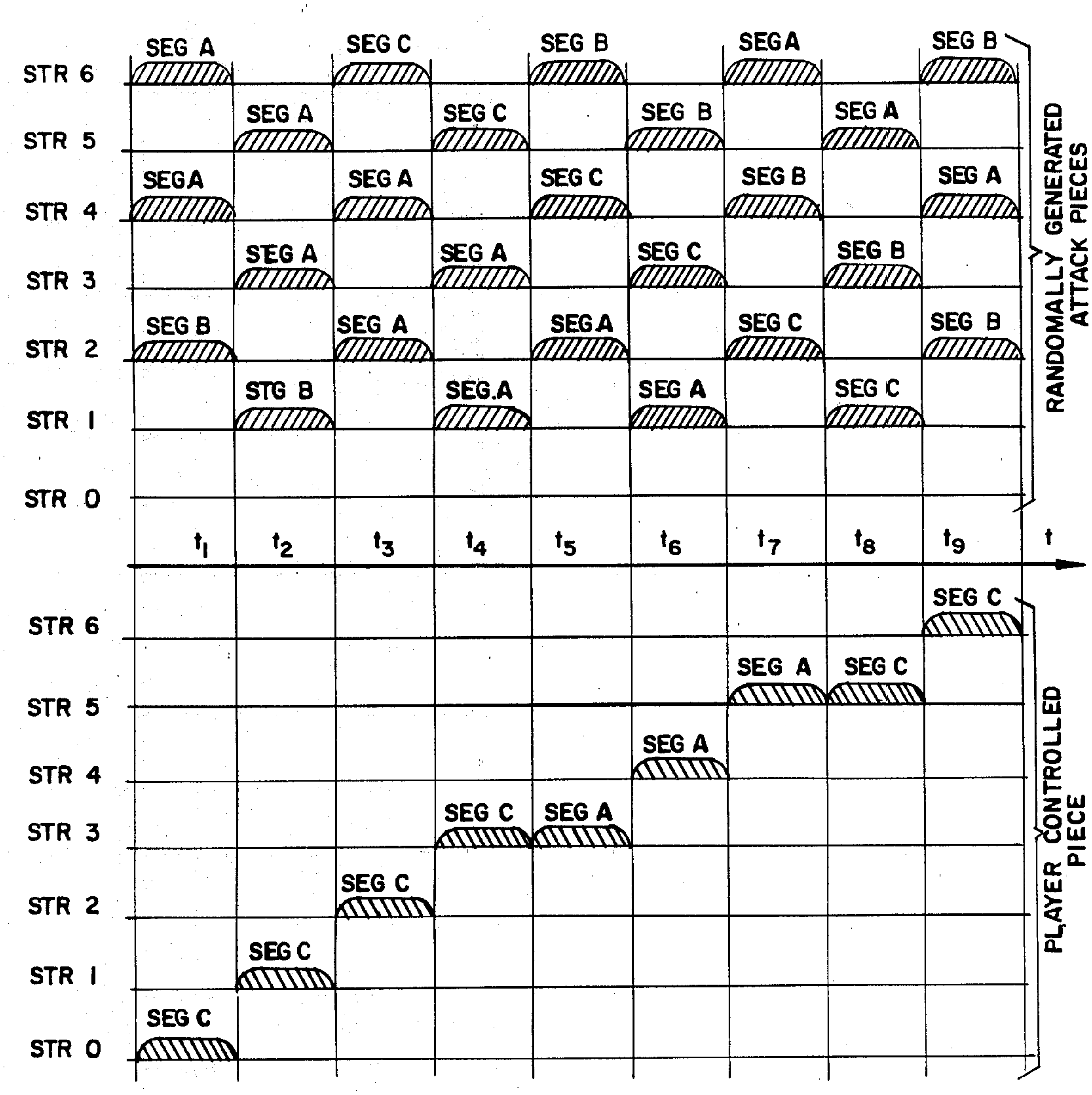
FIG. 7 is a timing diagram illustrating the operation of the display in an illustrative embodiment of a hand-held electronic game.

FIG. 7 is a timing diagram illustrative of a portion of the operation involved in an electronic game, such as the game of FIG. 1, in which there are a plurality of randomly generated attack pieces and one player controlled piece displayed at any one time. It will be assumed, for purposes of description, that it is the objective of the player of the game to maneuver the controlled piece by means of switches 12 and 14 to avoid any position coincidence of LEDs corresponding to the player controlled piece and the computer controlled pieces. It is further assumed that by continuously avoiding such coincidence, the player controlled piece progresses from left to right and by reaching the rightmost portion of the display, the player achieves the scoring of a goal which is registered by goal light 16 and digital display 16 of FIG. 1. Clearly, the position coincidence of the computer controlled pieces and the player controlled piece may be "sensed" by the microprocessor 41 in response to a time coincidence of identical segment and strobe signals for these pieces. A sensing of such a coincidence may be used to enable a series of penalty steps or subroutine to inhibit the player's progress toward a goal. FIG. 7 represents an arbitrary period during the operation of the game, which period is divided into nine equal time periods $t_1$ through $t_9$. Of course it will be understood that depending upon the rules of the game, the time involved in achieving the scoring of the goal by maneuvering a player controlled lighted object from the leftmost portion of the display to the rightmost portion of the display, could be some limited period to increase the challenge presented to the player.

For purposes of discussion, it will be assumed that the playing rules of the electronic game in which the display of the present invention is employed, provide for one player controlled piece on the display at any one time and three computer controlled attack pieces on the display at any one time. Other combinations can be implemented if desired.

Figure 8:
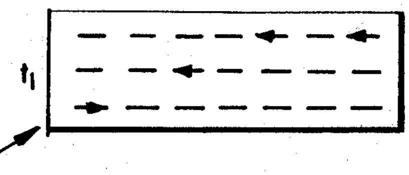
FIGS. 8 through 16 illustrate display operation in a typical hand-held electronic game.

Concurrent reference is now made to FIGS. 7 through 16. In FIG. 7, signal arrangements are illustrated in several time periods, while in FIGS. 8 through 16, the corresponding display status is presented. For example, it will be observed that at the time corresponding to $t_1$ (FIG. 7), there are three attack pieces on the display (FIG. 8) as a result of logic signals applied to STR 6, SEG A, STR 4, SEG A, and STR 2, SEG B. Also displayed is a single player controlled piece at the location corresponding to STR 0, SEG C (FIG. 7). This status of piece position on the display is represented by FIG. 8 wherein the computer controlled pieces are represented by left pointing arrowheads and the player control piece is represented by a right pointing arrowhead.

Figure 9:
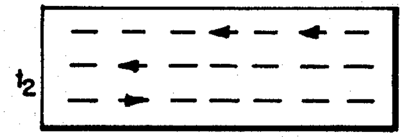

It will be assumed that the object of the game is for the player controlled piece to be moved from the left-most portion of the display to the right-most portion of the display without at any time being coincident in position with any of the attack pieces. Accordingly, it may be seen that for proper play at time $t_2$the player controlled piece has advanced along the lower most row of LEDs without any need to change rows because there are no oncoming attack pieces within that one row. Accordingly at $t_2$, each of the attack pieces has moved from right to left one position with the LEDs at STR 5, SEG A; STR 3, SEG A; and STR 1, SEG B; being enabled for light emission. Simultaneously the player controlled piece has moved from left to right one position and is positioned at the location corresponding to STR 1, SEG C as indicated in FIG. 9. It is further assumed for purposes of discussion that the rules of the game in which the display of the present invention is used, having been dictated by a particular program stored in the read-only memory unit 40 of the microprocessor 41 of FIG. 5, require that the attack pieces and player piece each move once during each clock interval $t_1$ through $t_9$. It is also assumed that movement for the attack pieces is always from right to left to an adjacent light-emitting diode. Conversely, the player controlled piece has the option of remaining in the present lane and moving forward to the light emitting diode or instead may be depression of either switch 12 or 14 of FIG. 1, one or two times, move a piece into one of the other two rows.

Figure 10:
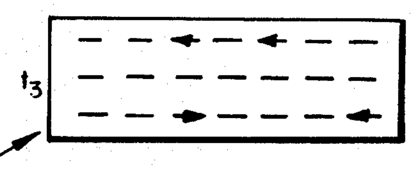
Figure 11:
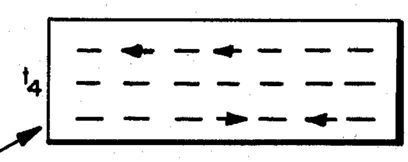
Figure 12:
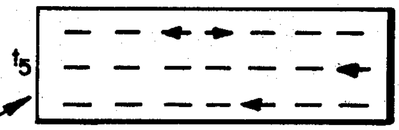

It will be observed in FIGS. 10 and 11 in conjunction with FIG. 7 that the player controlled piece continues to move from left to right taking the opportunities to gain position improvement towards the goal while no immediate obstacle endangers the player controlled piece. However, at time $t_5$ the player controlled piece is assumed to change from SEG C to SEG A at STR 3, thus moving to the uppermost row of the display to avoid the on-coming attack piece at STR 4, SEG C which upon the next cycle of the game clock would otherwise have been positioned coincident with the player controlled piece. Such an event which would either defeat the player or delay his achievement of the goal according to the rules.

Figure 13:
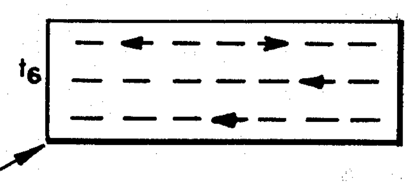
Figure 14:
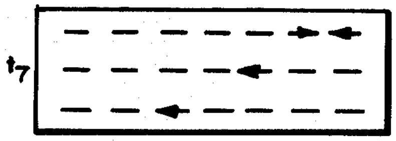
Figure 15:
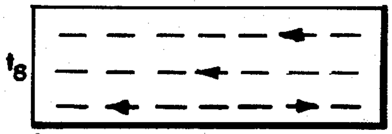
Figure 16:
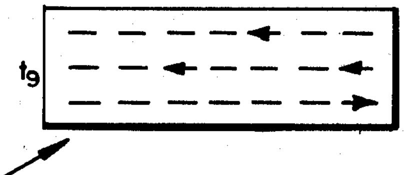

The following two time periods $t_6$ and $t_7$ correspond to FIGS. 13 and 14, respectively. The player controlled piece is assumed to remain in the uppermost row of the display to achieve additional left to right position change before being confronted with an impending coincidence of position with the attack piece located at the STR 6, SEG A immediately to the right of the player controlled piece. Accordingly, in order to avoid such position coincidence, it is assumed that at time period $t_8$, (i.e. the conditions represented by FIG. 15), the player controlled piece has been moved to the lowermost row of the display corresponding to the STR 5, SEG C position, which enables the player controlled piece during time $t_9$ to again achieve left to right position improvement and attain the goal scoring position of STR 6, SEG C.

It is to be understood that the playing rules of the game are not limitative of the invention being described and claimed herein. Such rules may be varied within the contemplation of the present invention. For example, it may be that in some games, the attack pieces would be generated in some random fashion or in some fashion that is dependent upon the position of the player control piece at the time the attack piece first appears at the right most position of the display. The rules may also be programmed to provide for computer controlled right to left motion of the player controlled piece upon position coincidence with an attack piece, so that the player controlled piece loses ground in the attempt to reach the rightmost portion of the display. Similarly, the rules may be programmed so that the player controlled piece does not gain a left to right transistion on the display unless it successfully avoids position coincidence with some minimum number of attack pieces passing the same strobe position from right to left.

It is preferable however that the microprocessor program employed in conjunction with the current invention, permit emulation of the appearance of substantially continuous motion of player controlled pieces and attack pieces, that motion being achieved by a change of position from one LED to an adjacent LED without shipping intermediate LEDs so that the appearance of realistic and uninterrupted motion may be achieved.

Although in FIGS. 8 through 16, arrowheads have been employed to illustrate the direction and position of apparent lighted objects, it will be understood that the LEDs of the current invention are preferably all of the same size and shape to simplify manufacture and minimize costs. Accordingly, a problem arises as to how one may distinguish between computer controlled pieces and the player controlled piece without unnecessarily increasing the complexity and cost of the display. One possibility is to employ monolithic multi-segment light-emitting diodes in each of the strobe and segment locations of the display matrix and then enable light emission of different combinations of such segments as a function of whether the location corresponds to a computer controlled piece or a player controlled piece. However, this would substantially increase the complexity and cost associated with light emission as a result of the increase in the number of segments and memory capacity required to distinguish between the two types of game pieces. It has been found advantageous to provide the distinguishing feature by means of brightness control which obviates the requirement for any physical differences in the segments enabled for light emission and also permits use of single chip discrete light-emitting diodes. The brightness control technique for providing means for distinguishing attack pieces and player controlled pieces is described below in conjunction with FIGS. 17 through 27.

Figure 17:
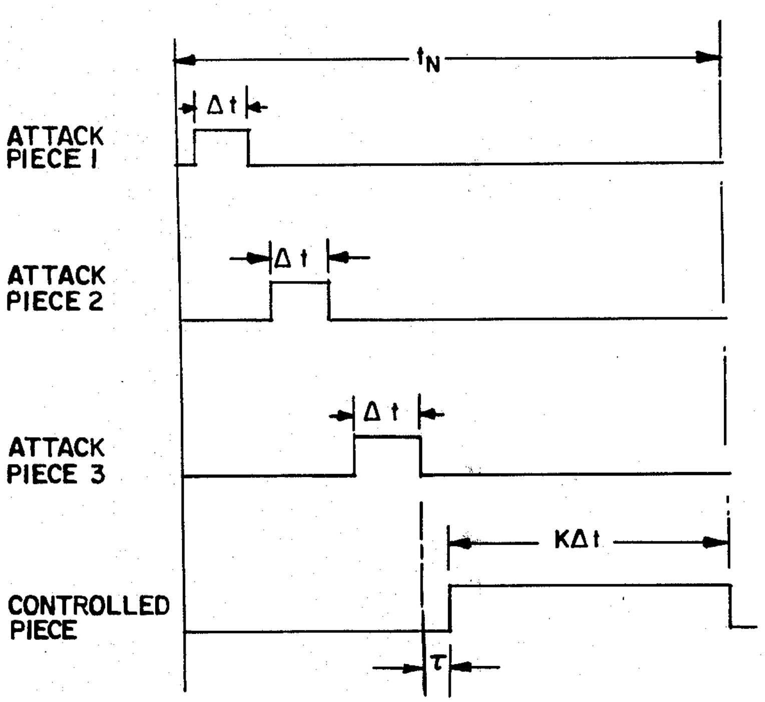
FIG. 17 is a timing diagram which is used to describe brightness variation of the lighted objects of the display.

FIG. 17 is a timing diagram representative of a preferred technique for distinguishing between attack pieces and a player controlled piece by means of distinguishing levels of brightness. As indicated in FIG. 17, this is accomplished by using a different period of current through a light-emitting diode corresponding to the location of an attack piece than the period of current through a light-emitting diode corresponding to the location of the player controlled piece. $t_N$ represents an arbitrary period such as any one of the periods $t_1$ through $t_9$ of FIG. 7. The uppermost waveform of FIG. 17 corresponds to the current supplied to attack piece 1 during the period $t_N$. The second and third waveforms from the top, represent similar waveforms for attack pieces 2 and 3, respectively. As indicated, current occurs over a duration $\Delta t$ which is assumed to be the period during which adequate enabling voltage is applied at both the corresponding strobe and segment terminals for the appropriate light-emitting diode. As indicated, there is no overlap between current flow intervals and, in fact, there is a small gap in time between current intervals that is designated $\tau$ in FIG. 17. It is assumed that $\tau$ is the time it takes to apply the segment signal after the strobe signal has been applied and during which time the light emitting diode selected is not yet enabled. The lowermost waveform of FIG. 17 represents the current interval for the player controlled piece. As indicated, current is supplied during a period $K\Delta t$, where K is some constant greater than 1. This longer current period produces light emission in the selected diode for a period of time substantially greater than the light emission duration for any of the computer controlled attack pieces and results in the perception of a brighter player controlled piece.

In a preferred embodiment, similar to the electronic handheld game of FIG. 1, K has been set equal to four so that the current duration to the player controlled piece is four times longer than the duration of current to the light emitting diodes corresponding to the attack pieces. This results in a brightness ratio of approximately 2:1 and renders the player controlled piece readily distinguishable over the attack pieces.

Figure 18:
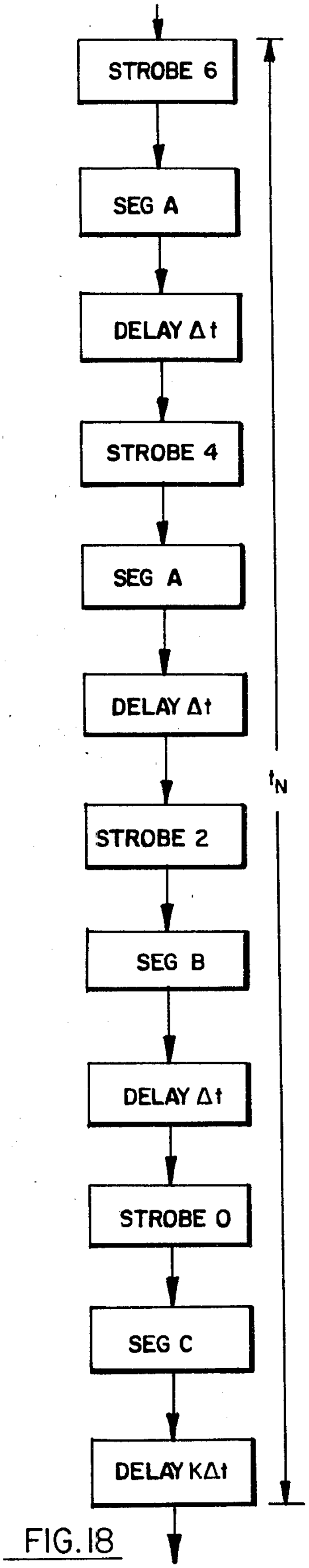
FIG. 18 is a flow chart representing a program sequence used to achieve brightness variation.
Figure 19:
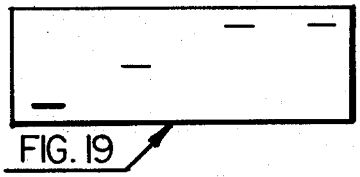
FIGS. 19 through 27 illustrate display operations including brightness variation in the invention as viewed by a player using a hand-held electronic game.
Figure 20:
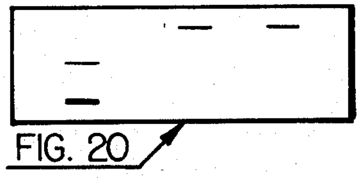
Figure 21:
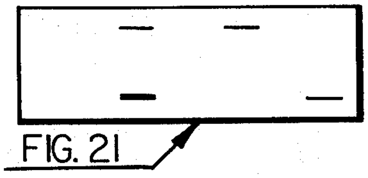
Figure 22:
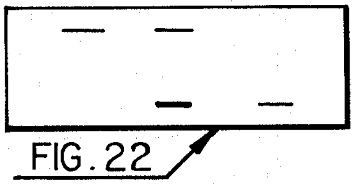
Figure 23:
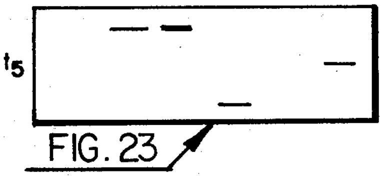
Figure 24:
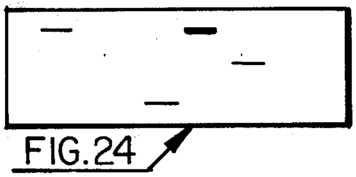
Figure 25:
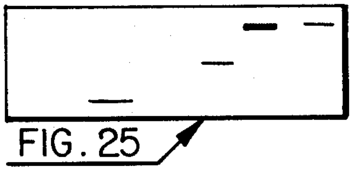
Figure 26:
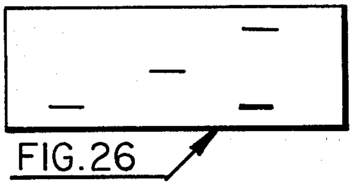
Figure 27:
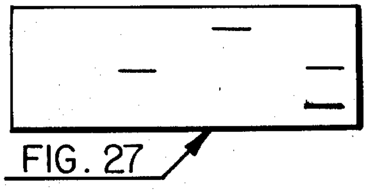

FIG. 18 is a flow chart representing the programmed microprocessor operations that provide the brightness levels illustrated in FIG. 17 for the time interval $t_N$. As shown in FIG. 18, the first operation at the uppermost portion of the flow chart is the application of the voltage at terminal strobe 6 followed by the application of voltage to segment A. This combination of applied voltages enables light emission by the light-emitting diode located at the matrix point corresponding to strobe 6, segment A, which is designated attack piece 1. The flow chart represented in FIG. 18 corresponds to the operations that take place to generate attack piece and player controlled piece positions of time period $t_1$ represented by FIG. 7 but with the player controlled piece being brighter than the attack pieces.

As further indicated in FIG. 18, after the application of the appropriate voltages strobe 6 and segment A, the next operation in the flow chart is a time delay of $\Delta t$ during which the application of the strobe and segment signals is maintained to enable the light emission of the attack piece 1 LED for that period of time. Subsequently, the attack piece 2 light-emitting diode is enabled for light emission by applying the appropriate voltage at strobe 4 and segment A terminals of the LED display and again maintaining the delay $\Delta t$ to produce the appropriate level of brightness. Thereafter, attack piece 3 is enabled for light-emission by applying voltage to terminals strobe 2 and segment B and again introducing the time delay $\Delta t$. Finally, as illustrated by the three lowermost operational blocks of the flow chart of FIG. 18, the appropriate voltages are applied to the light-emitting diode of the player controlled piece by applying the voltage to terminal strobe 0, segment C of the LED display and then maintaining voltage application the longer time interval $K\Delta t$ to achieve the higher brightness level of the player controlled piece.

It will now be understood that a series of operations corresponding to the operations represented in the flow chart of FIG. 18, is repeated for each time interval, such as time intervals $t_2$ through $t_9$, to produce the attack piece images and the player controlled piece image. Each such time interval will have the appropriate change in program control of strobe and segment terminals to achieve the position and brightness variations required to emulate the apparent continuous motion of lighted objects, at least one of which is distinguishable by brightness over the remainder.

FIGS. 19 through 27 correspond respectively to FIG. 8 through 16 in terms of player controlled piece and computer controlled piece positions. However, the player controlled piece is represented in somewhat heavier lines to illustrate the manner in which the brightness variation would appear to the user of the electronic hand-held game in FIG. 1. Furthermore, it is assumed that a light filter of plastic or glass or other suitable material, which predominately passes light having the optical wave length emitted by the LEDs of the display, is placed over the display to obfuscate light emitting diodes that have not been enabled. Thus, only the enabled attack pieces and the player controlled piece are visible as the game progresses. This feature adds to the realism of the display by producing a realistic simulation of continuous motion of lighted objects such as one finds in TV video games.

Figure 28:
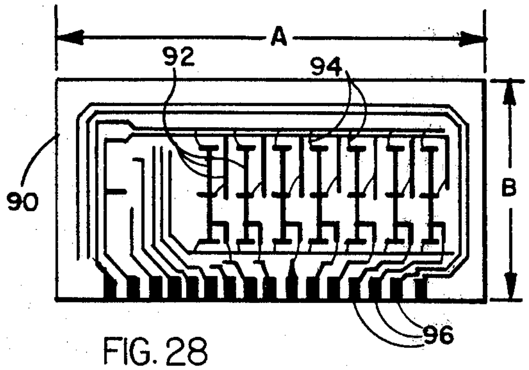
FIG. 28 is a circuit board layout of one embodiment of the display of the present invention.

It has been found convenient to fabricate the display of the present invention by utilizing a printed circuit board or the like with the light emitting diodes mounted directly on such boards of relatively high dielectric material. The manner in which the diodes are located and arranged physically on such a printed circuit board to achieve the strobe and segment control described above on an actual embodiment of such a printed circuit board 90, are shown in FIG. 28. The lines denoted 92 correspond to LED locations as well as printed circuit board etching. The lines denoted 94 correspond to wire jumpers that together with terminals 96 are used to implement the strobe and segment connections needed to control the selection and activation of the light emitting capability of the matrix. In one embodiment dimensions A and B are two inches and one inch respectively.

It will now be understood by those having ordinary skill in the art to which the present invention pertains that what has been described herein is a light-emitting diode display apparatus for use in hand-held electronic games and similar devices. Discrete light-emitting diode devices are employed having the appropriate size and shape of light emitting area and being arranged in a matrix configuration having the appropriate spacing between respective diodes. The result is a display which when operated under the control of a programmed microprocessor emulates lighted objects in substantially continuous motion for purposes of producing a video-type display for such games. It will also be understood that the present invention employs current duration control to provide brightness differences between a player controlled piece and computer controlled pieces to permit the game player to more easily distinguish one object from the others.

While the invention has been described with respect to the preferred physical embodiments constructed in accordance therewith, it will be apparent to those skilled in the art that various modifications and improvements may be made without departing from the spirit and scope of the invention. Accordingly, it is to be understood that the invention is not to be limited by the specific illustrative embodiment but only by the scope of the appended claims.

Having thus described a preferred embodiment of the invention, what is claimed is:

1. In a battery powered, hand-held game device having a case, a display supported by said case for emulating the appearance of distinguishable objects in motion along one or more paths defined by a plurality of spaced path positions, and a programmed controller supported by said case for establishing and controlling operations of said display, said programmed controller being programmed according to game rules whereby a first emulated object is attempted to be moved on said display without reaching a prescribed position relative to a second emulated object, the improved display which comprises:

a plurality of selectively energizable chips commonly arranged adjacent each other on a high dielectric supporting material, a single one of said chips disposed at each of said plurality of path positions at spacings for effectively providing perceptible images as said first and second emulated objects, each chip energizable to provide only one emulated object at such path position, each of said chips having an image producing area with a dimension of at least 0.037 inches, adjacent ones of said chips being spaced by a dimension of at least 0.150 inches for providing said image, whereby magnifying lenses for producing said spacings are avoided.

2. The combination according to claim 1 wherein said chips are light-emitting diodes.

3. The combination according to claim 2 wherein the light-emitting diode chips are all of a common geometric size and configuration.

4. The combination according to claim 2 and further including a drive circuit responsive to said controller for selectively providing repetitive pulses of energizing current of different durations to certain of said chips such as to produce the perceptible images to have perceptibly different visual characteristics.

5. The combination according to claim 4 wherein the spacing between said light-emitting diode chips and the geometric size and configurations of the light-emitting diode chips, and the repetitive rate at which said drive circuit produces said energizing current pulses are selected with respect to one another to produce said images in substantially continuous motion from a given path position to the adjacent path position.

6. The combination according to claim 2 wherein said light-emitting diode chips are all of a common rectangular geometry.

7. The combination according to claim 2 wherein the light-emitting diode chips are arranged on said display in parallel rows.

8. The combination according to claim 1 and further including a drive circuit responsive to said controller for selectively providing driving power to certain of said chips according to first and second characteristics of the driving power such as to produce the perceptible images to have perceptibly different visual characteristics.

9. In a battery-powered, hand-held game device having a case, a display supported by said case for emulating the appearance of distinguishable objects in motion along one or more paths defined by a plurality of spaced path positions, and a programmed controller supported by said case for establishing and controlling operations of said display, said programmed controller being programmed according to game rules whereby a first emulated object is attempted to be moved on said display without reaching a prescribed position relative to a second emulated object, the improved display which comprises:

(a) a plurality of selectively energizable light-emitting diode chips of substantially like geometric size and configuration, the chips being commonly arranged in spaced substantially parallel rows on a high dielectric supporting material at said plurality of path positions for effectively providing perceptible images as said first and second emulated objects, each path position having only a single image producing chip energizable to provide only one emulated object at its path position; each of said chips having an image producing area with a dimension of at least 0.037 inches, adjacent ones of said chips being spaced by a dimension of at least 0.150 inches for providing said image, whereby magnifying lenses for producing said spacings are avoided; and (b) a drive circuit responsive to said controller for selectively providing repetitive pulses of energizing current of different durations to certain of said chips such as to produce the perceptible images to have perceptibly different visual characteristics.

* * * * *

UNITED STATES PATENT AND TRADEMARK OFFICE

CERTIFICATE OF CORRECTION

PATENT NO. : 4,344,622

DATED : August 17, 1982

INVENTOR(S) : Joseph Nissim

It is certified that error appears in the above-identified patent and that said Letters Patent are hereby corrected as shown below:

Column 6, line 29, change [16] to read --18--.

Column 8, line 18, change [shipping] to read --skipping--.

Signed and Sealed this

*Eleventh* Day of *January 1983*

[SEAL]

*Attest:*

GERALD J. MOSSINGHOFF

*Attesting Officer* *Commissioner of Patents and Trademarks*